United States Patent [19]

Shuen

[11] Patent Number: 4,937,711
[45] Date of Patent: Jun. 26, 1990

[54] BUILT-UP DOME LAMP FRAME

[76] Inventor: Shun-Tang Shuen, No. 295, Wu-Hua Street, Sanchung, Taipei Hsien, Taiwan

[21] Appl. No.: 153,408

[22] Filed: Feb. 8, 1988

[51] Int. Cl.⁵ .............................................. B60Q 1/02
[52] U.S. Cl. ....................................... 362/74; 362/61; 362/249; 362/388; 362/396
[58] Field of Search .................... 362/74, 249, 388, 61, 362/80, 396, 418, 83.3

[56] References Cited

U.S. PATENT DOCUMENTS

| | | | |
|---|---|---|---|
| 3,271,735 | 9/1966 | Gosswiller | 362/74 X |
| 3,721,374 | 3/1973 | Eby | 362/74 |
| 4,692,845 | 9/1987 | Widhalm et al. | 362/61 X |
| 4,722,030 | 1/1988 | Bowden | 362/74 X |
| 4,754,375 | 6/1988 | Ferenc | 362/74 |
| 4,791,535 | 12/1988 | Sclafani et al. | 362/61 X |

Primary Examiner—Ira S. Lazarus
Assistant Examiner—Sue Hagarman
Attorney, Agent, or Firm—Lowe, Price, LeBlanc, Becker & Shur

[57] ABSTRACT

A built-up dome lamp frame, mainly composed of two locating rods and one or more link rods to extend the frame length, wherein one of the locating rods comprises a locating channel on one side and a track channel on the other side; said locating channel being for the fixation of the locating tongue of the other locating rod or the link rod so as to let the track channel of each locating rod be able to connect with a support; said support being fixed to a proper location within the respective track channel so as to let clamping devices match with each adjusting element to fix the whole frame body onto the dome of the car.

7 Claims, 7 Drawing Sheets

BUILT-UP DOME LAMP FRAME

BACKGROUND OF THE INVENTION:

Ordinarily, for hunting or other specific purposes, people may attach a dome lamp frame to their cars for the arrangement of searchlights to provide a bright lighting right ahead of the car for a long distance. However, these conventional lamp frames are not good enough and have some shortcomings difficult to settle, such as:

1. These dome lamp frames are made in an integrated part. They are only applicable to certain kinds of cars because the adjusting structure of the frames is limited to a very narrow range.

2. It is difficult to mount this kind of dome lamp frames to the cars. For setting the frame, it may be necessary to destroy some parts of the car. The structure of these dome lamp frames is not very secure and breaks down easily. Sometimes, the vibration of the car may cause the lamp frame to be distorted.

3. These dome lamp frames are not applicable to all cars. Cars of different width should be equipped with a frame of different specifications. Therefore, these prior art frames can not be made in one unified specification and the cost of which must be high.

4. The size of conventional dome lamp frames is large. They are not easy to assemble, to dismount, to store or to transport.

In view of the problems aforesaid, the present invention is created to provide the following advantages:

1. This dome lamp frame is made of aluminum alloy, which is light in weight for easy transportation.

2. The frame is built up by the linkage of elements to match with moveable supports. Therefore, it is applicable to all cars.

3. Because the frames use a slip-on connection for assembly, all the parts can be manufactured in unified specifications to reduce the cost. Therefore, the package, the storage, the transportation, the dismounting and the assembly of the inventive frame are simple and convenient.

4. The frame is firmly fixed to the car and secured by the attached support and clamping device to protect the frame from distortion.

SUMMARY OF THE INVENTION:

The present invention provides a built-up dome lamp frame, especially a frame structure which can be easily mounted to and dismounted from cars, wherein two locating rods and one or more link rods and supports are attached to the frame, one of said locating rods comprising a locating channel on one side and a track channel on the other side, the other locating rod comprising respectively on both ends a locating tongue and a track channel to allow said two locating rods to be connected together; said link rods permit the frame to fit all cars of different widths; said supports and clamping devices locate the whole frame body onto the top edge of car windows for the setting of dome lamp.

BRIEF DESCRIPTION OF THE DRAWINGS:

FIG. 6a illustrates the structure of an adjusting element for the preferred embodiment.

Figure 1:
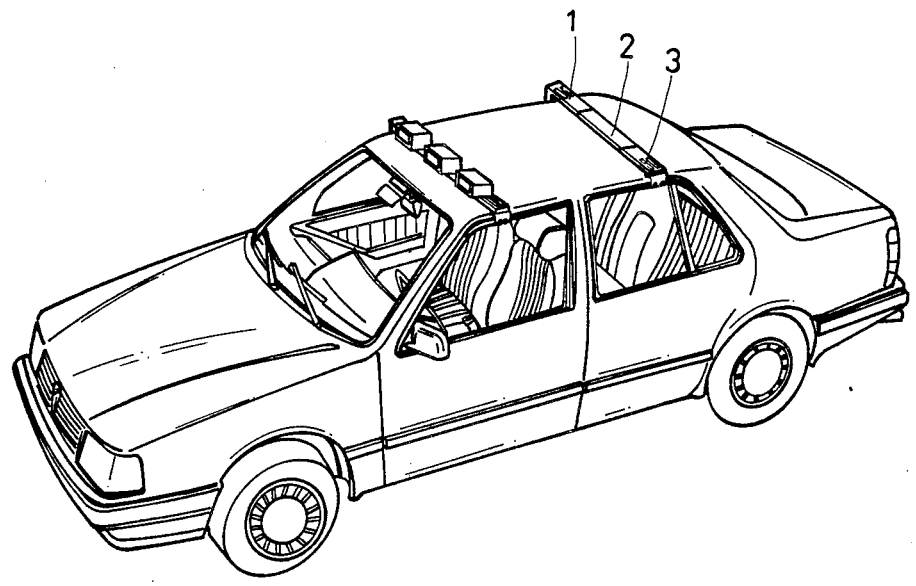
FIG. 1 illustrates a frame of the present invention fixed to a car.

DETAILED DESCRIPTION OF THE PREFERRED EMBODIMENT:

As shown in FIG. 1, 2, 3, and 4, the present invention is mainly composed of locating rods (1) (3), link rod (2), support (4) and clamping device (5), wherein the length of locating rods (1) (3) and link rod (2) is arranged according to requirement.

Said locating rod (1) has a locating channel (11) that comprises a reinforcing rod (111), which channel is for the insertion of a locating tongue (21) or (31) of the link rod (2) or locating rod (3), respectively, and firmly fixed with bolts (113) (113') (The bolts can be of concealing type). The other end of the locating rod (1) has a track channel (12) that comprises two strip channel holes (121) (121'), said channel holes forming a track for the support (4) to slip in and to be fixed therein at a proper location by bolts (41) (41') through bolt holes (422) (422'), shown in FIG. 3 for support 4'. Said track channel (12) comprises in the center a channel rib (122) to reinforce the security and to let the arc dent (421) of the locating seat (42) of the support (4) be firmly in contact so as to strengthen the bearing force and to keep it slide in a certain track. Said support (4) comprises a reinforcing rib (43) to support heavy loading force. Said support (4) also has a horizontal rib (44) which comprises bolt holes (441) (442) for bolts (45) (45') to screw up said clamping device (5) together.

Please refer to FIG. 4, 5, 6 and 6a. Each of said clamping devices (5), (5') comprises respectively, an opening hole (51), (51') and a vertical hook (52), (52') for respective bolts (45) (45') to respectively insert into the holes (441) (442) of the support (4) through the clamping devices (5), (5') and adjusting elements (53), (53') and to be fastened up with nuts (46) (46'). Said adjusting element (53) comprises a hexagonal plate (531) and an eccentric plate (532), which position can be adjusted by a wrench so as to change the distance between the clamping device (5) and the support (4) for the fixation of the present invention onto the top edge of car windows.

Please refer again to FIG. 1-4. The other locating rod (3) comprises on one side a locating tongue (31) and on the other side a track channel (32). The structure of this track channel (32) is similar to the track channel (12) of the locating rod (1), so that the locating rod (3) can be connected with the support (4'). The locating tongue (31) of the locating rod (3) comprises bolt holes (311)

(311') and dents (312) (312'). Said dents (312) (312') are to match with the reinforcing rib (111) or (221) of the locating channel (11) or (22) of locating rod (1) or link rod (2), respectively, so as to let bolts (113) (113') or (222) (222') screw them up together by means of holes (112) (112') and (311) (311') or (223) ( 223') and (311) (311').

The link rod (2) for the invention comprises a locating tongue (21) at one end, and a locating channel (22) at the other end, the structure of which is same as aforesaid. The link rods (2) for the invention can be manufactured in different lengths for the connection of locating rods (1) (3) to fit the cars of all sizes.

Figure 7:
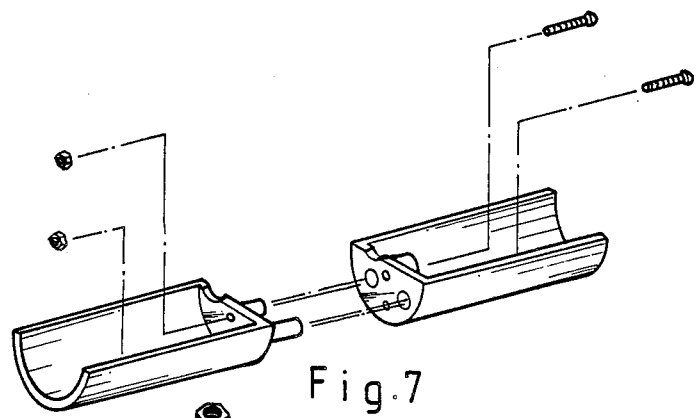
FIG. 7 illustrates a connection structure between one locating channel and one locating tongue.
Figure 8:
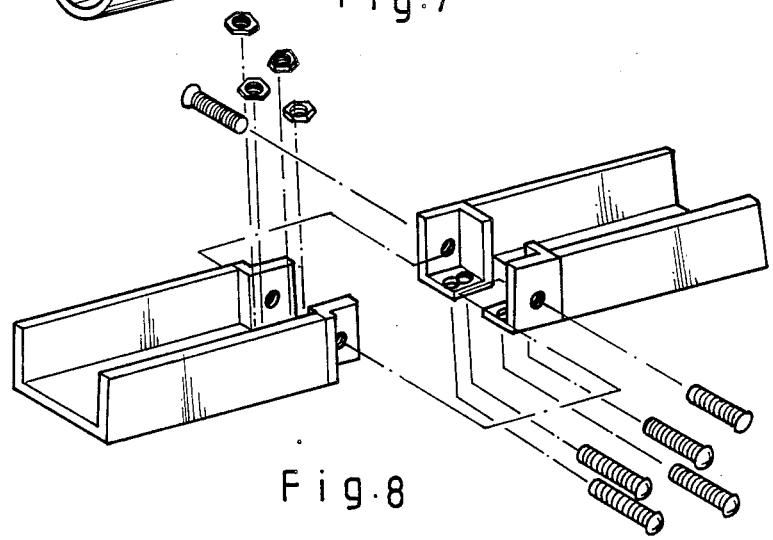
FIG. 8 illustrates another connecting structure between another locating channel and another locating tongue.
Figure 9:
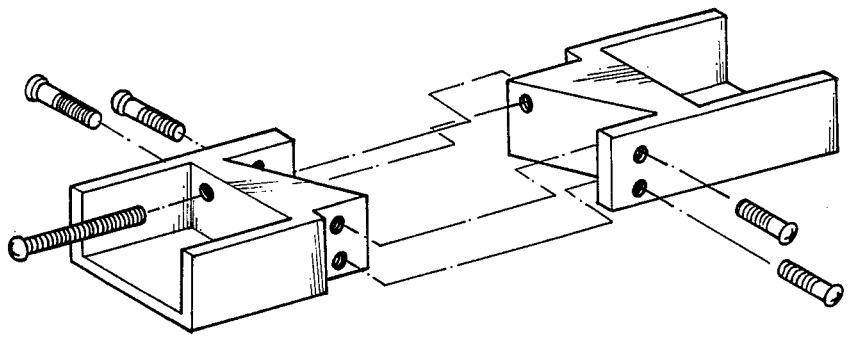
FIG. 9 illustrates the other connecting structure between the other locating channel and the other locating tongue.

Please refer to FIG. 7, 8 and 9. The present invention can be manufactured into different connecting structures to undertake vibrating force due to heavy loading.

The modified locating rod (1') and link rod (2') structures are shown in the figures.

Figure 2:
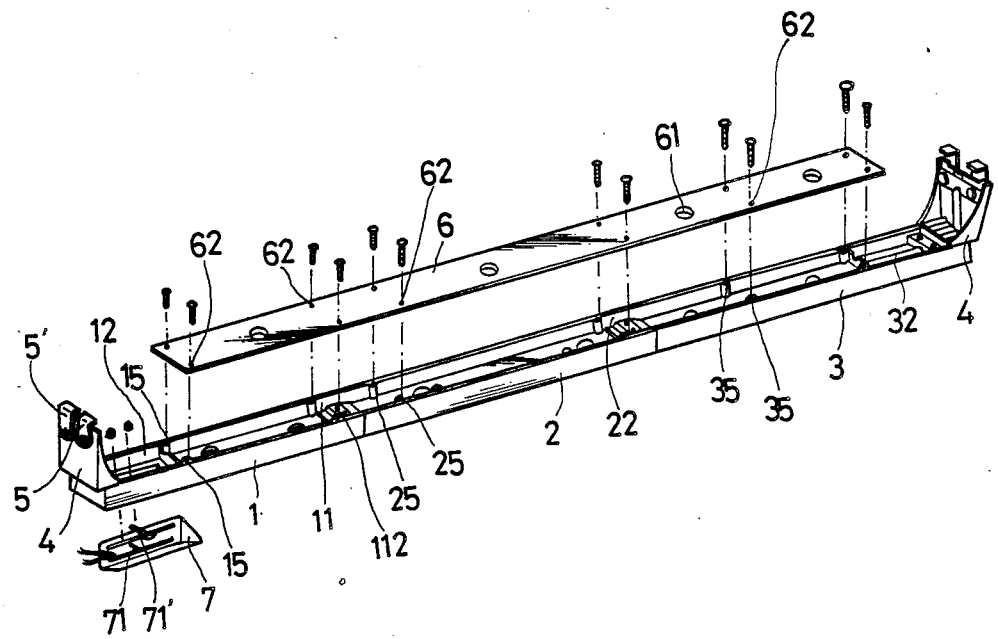
FIG. 2 is a perspective view of a dome lamp frame embodying the present invention.
Figure 3:
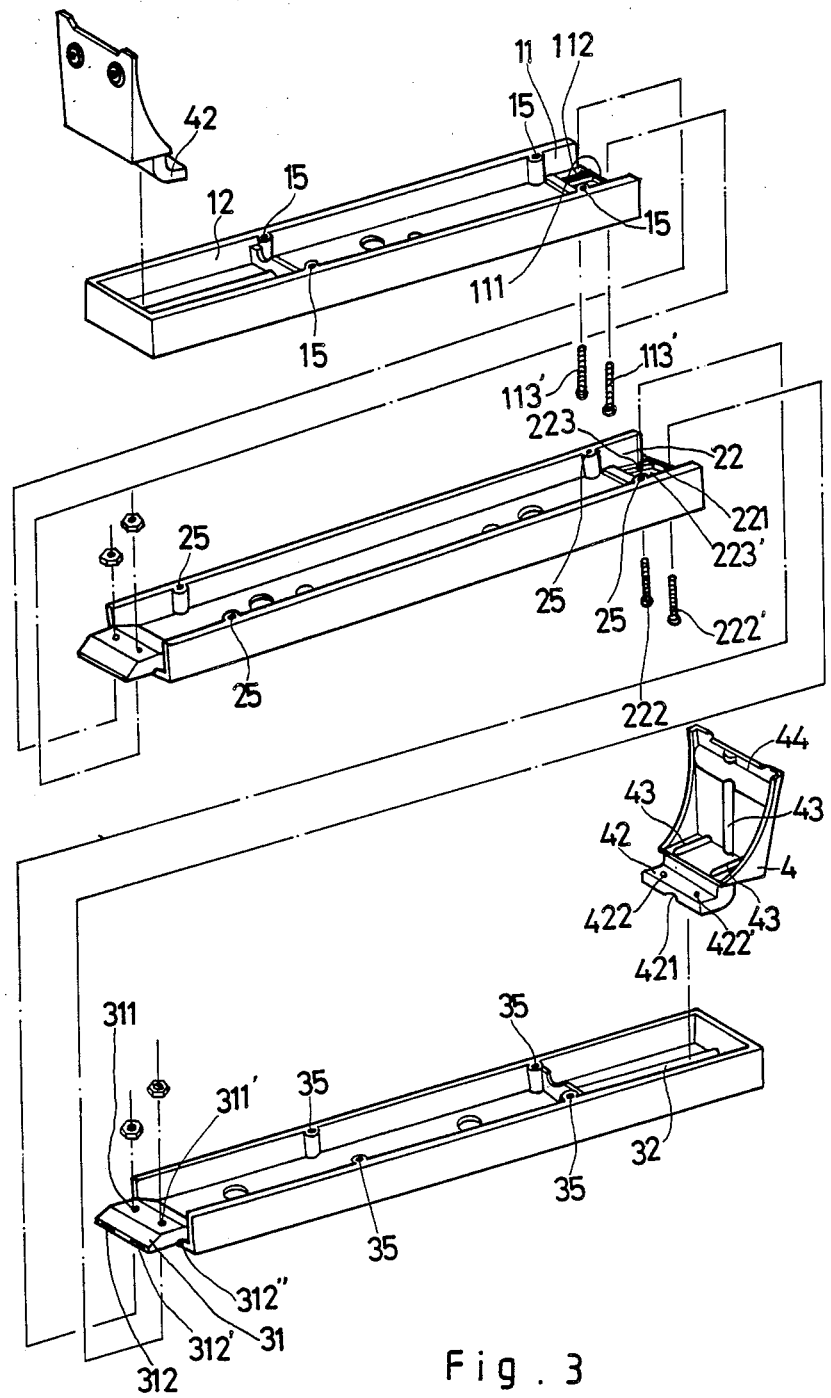
FIG. 3 is an assembly drawing of the preferred embodiment.
Figure 4:
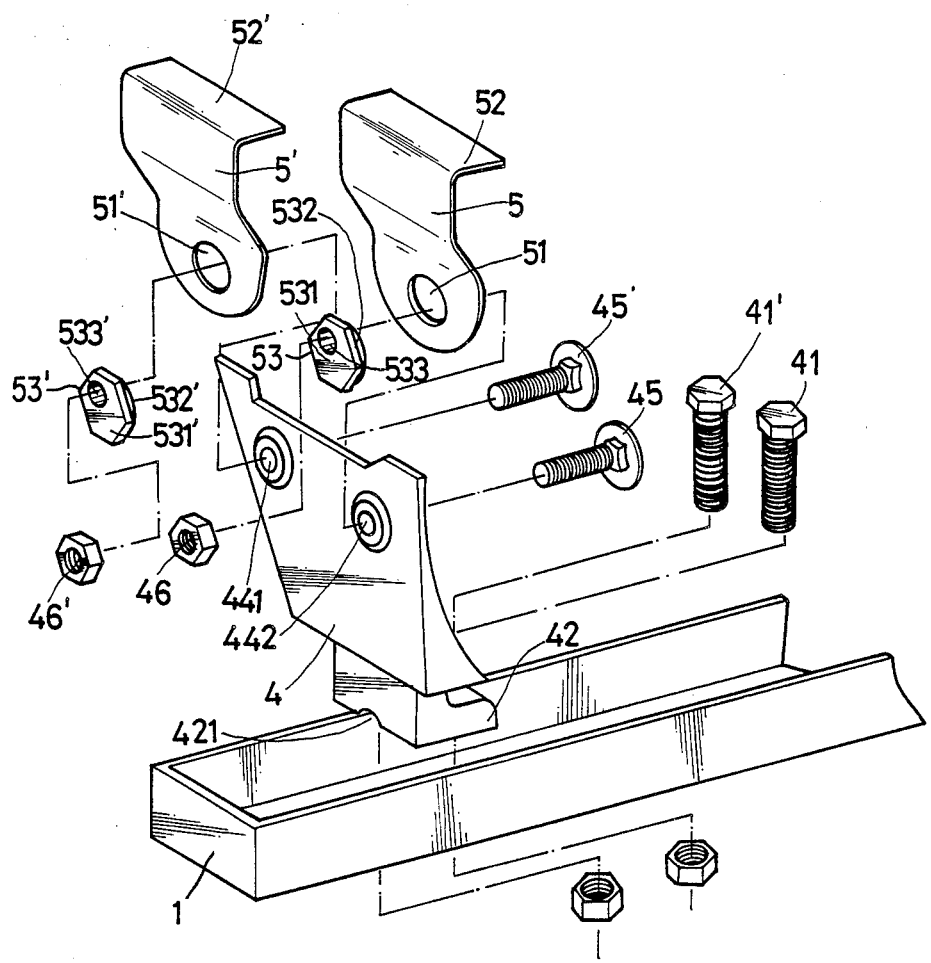
FIG. 4 is a assembly drawing of locating rod and a support for the preferred embodiment.
Figure 5:
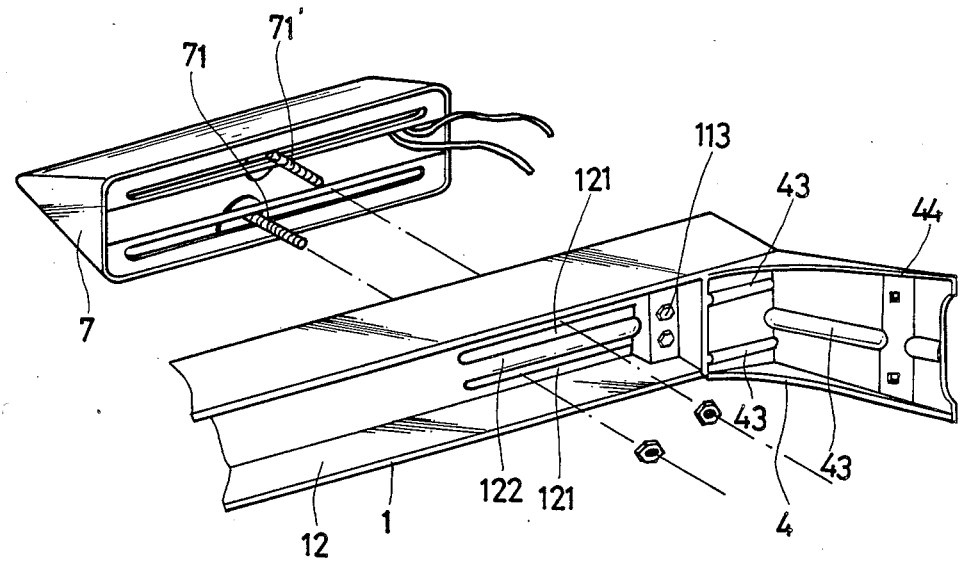
FIG. 5 illustrates the structure of the locating rod, support and lamp for the preferred embodiment.
Figure 6:
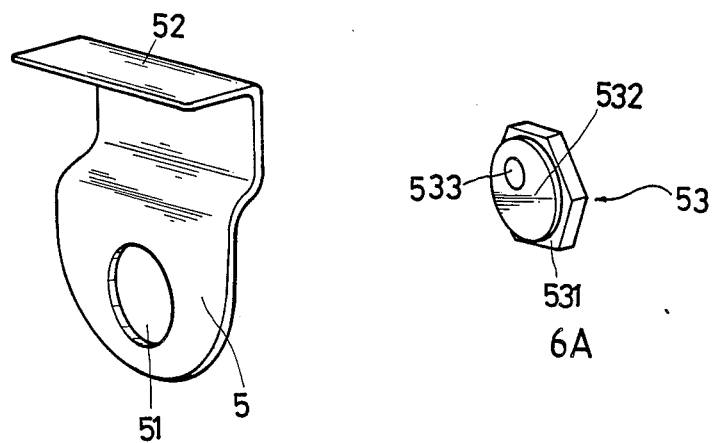
FIG. 6 illustrates the structure of a clamping device for the preferred embodiment.

Referring to FIGS. 2, 3 and 5, each locating rod (1), link rod (2) and locating rod (3) comprises respectively an opening hole (13) (23) (33), each said opening hole (13) (23) (33) has a reinforcing arch surface for the location of lamp holder. Electric wires are inserted into the cable holes (14) (24) (34) through the opening hole (61) of the division (6) to connect to the battery of the car Said division (6) comprises several bolt holes (62) for bolts to fix it to the bolt columns (15)(25)(35). As shown in FIG. 5, in order to make the invention more attractive and according to specific requirement, a signal lamp (7) can be firmly fixed to the strip channel holes (121) (121') of the track channels of the locating rods (1) (3) by means of bolts (71) (71') to fasten them up.

Figure 10:
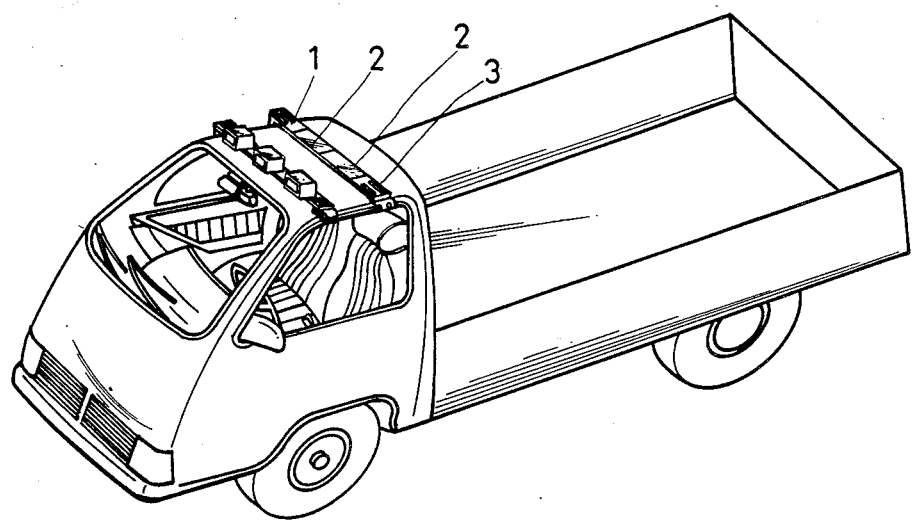
FIG. 10 illustrates a preferred embodiment of the invention fixed to a truck.

As shown in FIG. 10, the number of link rods (2) can be increased, according to requirement, so as to make the invention be applicable for use on trucks.

I claim:

1. A built-up dome lamp frame, composed of:
    a locating rod, which comprises a locating channel at one end and a track channel at the other end, said locating channel including interiorly a reinforcing rib, and said track channel including interiorly two strip channel holes and a reinforcing track rib for fixation of a lamp;
    a link rod, which comprises a locating channel at one end and a locating tongue at the other end, said locating channel including a reinforcing rib, said locating tongue including opening holes for fixation of said link rod to said locating rod;
    another locating rod, which comprises a locating tongue at one end and a track channel at the other end, said locating tongue including a dent for connection to one of said locating rod or said link rod, said track channel including a strip channel hole and a reinforcing track rib;
    a support, which comprises at a lower portion thereof a locating holder to match with said track channel and by means of bolts to firmly fix to said locating rods, said support also including locating holes at an upper portion thereof for the placement of an adjusting element which is fixed to a clamping device by means of bolts;
    said clamping device being bent to an angle of 90 (as a vertical plane) so as to cooperate with said support for the fixation of the frame onto a car;
    a division, which is in a shape of a strip, including several bolt holes for bolts to affix said locating rods and said link rod to form an adjustable dome lamp frame for the fixation of dome lamps, and which frame can be adjusted to fit cars of all sizes.

2. A built-up dome lamp frame as claimed in claim 1, wherein the length of said two locating rods and one link rod can be flexibly arranged according to requirement and wherein the assembly of the present invention can be made independent of the link rod if the fixation of two locating rods can fit the width of the car.

3. A built-up dome lamp frame as claimed in claim 1, wherein the track channel of said locating rod is applicable for the fixation of a signal lamp.

4. A built-up dome lamp frame as claimed in claim 1, wherein the locating holder of said support comprises at a lower portion thereof an arc dent to be closely in contact with said reinforcing track rib so that the support can be moved to a proper location for fixation to fit the width of the car.

5. A built-up dome lamp frame as claimed in claim 1, wherein the support comprises a reinforcing rib and a horizontal rib to strengthen itself for heavy loading.

6. A built-up dome lamp frame as claimed in claim 1, wherein, in order to resist against a vibrating force of the lamp, the structure for connecting the locating rod and the link rod is variable to fit different requirements, and wherein said link rod and said locating rod are firmly fixed together by bolts.

7. A built-up dome lamp frame as claimed in claim 1 wherein said adjusting element comprises a hexagonal plate and an eccentric plate adjustably positonable for changing a distance between said clamping device and said support.

* * * * *